(12) United States Patent
Hull et al.

(10) Patent No.: US 7,684,068 B2
(45) Date of Patent: Mar. 23, 2010

(54) METHOD AND SYSTEM FOR AUTOMATICALLY AND TRANSPARENTLY ARCHIVING DOCUMENTS AND DOCUMENT META DATA

(75) Inventors: Jonathan J. Hull, San Carlos, CA (US);
Kurt Piersol, Santa Cruz, CA (US);
Mark Peairs, Menlo Park, CA (US);
John Cullen, Mountain View (IE);
Michael Baxter, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 91 days.

(21) Appl. No.: 10/758,067

(22) Filed: Jan. 14, 2004

(65) Prior Publication Data

US 2004/0160629 A1  Aug. 19, 2004

Related U.S. Application Data

(63) Continuation of application No. 09/430,377, filed on Oct. 29, 1999, now Pat. No. 6,704,118, which is a continuation-in-part of application No. 09/347,953, filed on Jul. 6, 1999, now Pat. No. 6,665,086, which is a continuation of application No. 08/754,721, filed on Nov. 21, 1996, now Pat. No. 5,978,477.

(51) Int. Cl.
*G06F 15/00* (2006.01)
*H04N 1/00* (2006.01)

(52) U.S. Cl. .................... 358/1.15; 358/1.16; 358/402

(58) Field of Classification Search ................ 358/1.12, 358/1.13, 1.14, 1.15, 404, 407, 442, 444, 358/402, 1.16, 1.18, 468, 403; 379/100.01
See application file for complete search history.

(56) References Cited

U.S. PATENT DOCUMENTS

| 4,839,741 A | 6/1989 | Wilson |
| 4,876,609 A | 10/1989 | Ogura |
| 4,957,689 A | 9/1990 | Ohnishi et al. |

(Continued)

FOREIGN PATENT DOCUMENTS

JP          03-179539 A          8/1991

(Continued)

OTHER PUBLICATIONS

Engst, A., "Eudora for Windows & Macintosh, visual quickstart guide," pp. xii, 1-5, 10-11, 53-56, 61-65, 74-75, 87-88, 108 and 133-134 (1997).

(Continued)

*Primary Examiner*—Madeleine A Nguyen
(74) *Attorney, Agent, or Firm*—Townsend and Townsend and Crew LLP

(57) ABSTRACT

According to the present invention, an automatic archiving system that makes document archiving largely transparent to the user. In one embodiment, documents scanned in or printed during the course of office equipment operation are automatically archived. For example, an office local area network (LAN) may interconnect a copier, a printer, a facsimile machine, and a document management workstation. Whenever, a document is copied, printed, or faxed, a document image is archived by the document management workstation without further user intervention. A single user command results in the document being copied and archived, printed and archived, or faxed and archived.

17 Claims, 5 Drawing Sheets

U.S. PATENT DOCUMENTS

| | | | |
|---|---|---|---|
| 5,241,472 A | | 8/1993 | Gur et al. |
| 5,459,579 A * | | 10/1995 | Hu et al. ............... 358/296 |
| 5,465,353 A | | 11/1995 | Hull et al. |
| 5,499,108 A | | 3/1996 | Cotte et al. |
| 5,579,087 A | | 11/1996 | Salgado |
| 5,608,786 A * | | 3/1997 | Gordon ............... 370/352 |
| 5,613,108 A * | | 3/1997 | Morikawa ............ 707/200 |
| 5,619,649 A | | 4/1997 | Kovnat et al. |
| 5,642,199 A | | 6/1997 | Ukai et al. |
| 5,657,461 A * | | 8/1997 | Harkins et al. ......... 715/733 |
| 5,675,507 A | | 10/1997 | Bobo, II |
| 5,689,642 A * | | 11/1997 | Harkins et al. ......... 709/207 |
| 5,689,755 A | | 11/1997 | Ataka |
| 5,701,183 A * | | 12/1997 | Bellemare et al. ...... 358/404 |
| 5,704,060 A | | 12/1997 | Del Monte |
| 5,706,457 A * | | 1/1998 | Dwyer et al. ........... 715/835 |
| 5,717,940 A | | 2/1998 | Peairs |
| 5,726,883 A | | 3/1998 | Levine et al. |
| 5,732,214 A | | 3/1998 | Subrahmanyam |
| 5,754,308 A | | 5/1998 | Lopresti et al. |
| 5,760,917 A | | 6/1998 | Sheridan |
| 5,764,866 A | | 6/1998 | Maniwa |
| 5,764,918 A | | 6/1998 | Poulter |
| 5,764,972 A | | 6/1998 | Crouse et al. |
| 5,768,483 A | | 6/1998 | Maniwa et al. |
| 5,771,101 A | | 6/1998 | Bramall |
| 5,784,177 A | | 7/1998 | Sanchez et al. |
| 5,790,790 A | | 8/1998 | Smith et al. |
| 5,805,298 A | | 9/1998 | Ho et al. |
| 5,812,398 A | | 9/1998 | Nielsen |
| 5,812,747 A | | 9/1998 | Kayano et al. |
| 5,813,009 A * | | 9/1998 | Johnson et al. ......... 707/100 |
| 5,832,474 A | | 11/1998 | Lopresti et al. |
| 5,867,597 A | | 2/1999 | Peairs et al. |
| 5,870,746 A | | 2/1999 | Knutson et al. |
| 5,881,233 A | | 3/1999 | Toyoda et al. |
| 5,890,163 A * | | 3/1999 | Todd ............... 707/200 |
| 5,893,908 A | | 4/1999 | Cullen et al. |
| 5,911,044 A | | 6/1999 | Lo et al. |
| 5,948,058 A | | 9/1999 | Kudoh et al. |
| 5,978,477 A | | 11/1999 | Hull et al. |
| 5,982,507 A | | 11/1999 | Weiser et al. |
| 6,020,980 A | | 2/2000 | Freeman |
| 6,073,142 A * | | 6/2000 | Geiger et al. ........... 715/500 |
| 6,115,509 A | | 9/2000 | Yeskel |
| 6,161,097 A * | | 12/2000 | Glass et al. ........... 705/6 |
| 6,167,431 A * | | 12/2000 | Gillies et al. ......... 709/203 |
| 6,185,683 B1 * | | 2/2001 | Ginter et al. .......... 713/176 |
| 6,199,073 B1 * | | 3/2001 | Peairs et al. .......... 707/204 |
| 6,219,158 B1 | | 4/2001 | Dawe |
| 6,252,588 B1 | | 6/2001 | Dawson |
| 6,253,193 B1 * | | 6/2001 | Ginter et al. .......... 705/57 |
| 6,292,783 B1 * | | 9/2001 | Rohler et al. .......... 705/2 |
| 6,347,374 B1 * | | 2/2002 | Drake et al. ........... 726/1 |
| 6,356,633 B1 * | | 3/2002 | Armstrong ........... 379/265.11 |
| 6,370,573 B1 * | | 4/2002 | Bowman-Amuah ...... 709/223 |
| 6,401,239 B1 * | | 6/2002 | Miron ............... 707/203 |
| 6,411,947 B1 * | | 6/2002 | Rice et al. ............ 706/47 |
| 6,442,589 B1 * | | 8/2002 | Takahashi et al. ...... 709/203 |
| 6,445,932 B1 * | | 9/2002 | Soini et al. ........... 455/556.1 |
| 6,487,558 B1 * | | 11/2002 | Hitchcock ............ 707/200 |
| 6,603,569 B1 * | | 8/2003 | Johnson et al. ........ 358/1.15 |
| 6,609,138 B1 * | | 8/2003 | Merriam ............. 707/204 |
| 6,665,679 B2 * | | 12/2003 | Curtis et al. ......... 707/100 |
| 6,678,705 B1 * | | 1/2004 | Berchtold et al. ...... 707/204 |
| 6,704,118 B1 | | 3/2004 | Hull et al. |
| 6,928,442 B2 * | | 8/2005 | Farber et al. .......... 707/10 |
| 6,957,235 B2 * | | 10/2005 | Peairs et al. .......... 707/204 |
| 6,983,308 B1 * | | 1/2006 | Oberhaus et al. ....... 709/206 |
| RE39,090 E * | | 5/2006 | Beauregard et al. ..... 707/6 |
| 7,047,415 B2 * | | 5/2006 | Doyle et al. .......... 713/178 |
| 7,239,406 B1 * | | 7/2007 | Piersol et al. ......... 358/1.15 |
| 2001/0047286 A1 * | | 11/2001 | Walker et al. ......... 705/9 |
| 2002/0007356 A1 * | | 1/2002 | Rice et al. ............ 706/47 |
| 2003/0208608 A1 * | | 11/2003 | Merriam ............. 709/229 |
| 2005/0125714 A1 * | | 6/2005 | Freeman et al. ....... 715/500.1 |
| 2006/0031303 A1 * | | 2/2006 | Pang ............... 709/206 |
| 2006/0168067 A1 * | | 7/2006 | Carlson et al. ........ 709/206 |
| 2007/0260980 A1 * | | 11/2007 | Freeman et al. ....... 715/530 |

FOREIGN PATENT DOCUMENTS

| | | |
|---|---|---|
| JP | 04-130860 | 5/1992 |
| JP | 05-274210 A | 10/1993 |
| JP | 05/308450 | 11/1993 |
| JP | 07/212602 | 8/1995 |
| JP | 07-288621 | 10/1995 |
| JP | 08-314780 A | 11/1996 |
| JP | 08-154170 | 6/1998 |
| WO | WO 95/01821 | 8/1995 |

OTHER PUBLICATIONS

PCT International Preliminary Examination Report for GB 96/01471.

Office Action of Jul. 24, 2007 in related Japanese application 2005-379918.

Communication mailed Jul. 24, 2007, received from the Japanese Patent Office in Japanese Application 2006-028853.

* cited by examiner

METHOD AND SYSTEM FOR AUTOMATICALLY AND TRANSPARENTLY ARCHIVING DOCUMENTS AND DOCUMENT META DATA

STATEMENT OF RELATED APPLICATIONS

Cross References to Related Applications

This application is a continuation application of and claims the benefit of U.S. patent application Ser. No. 09/430,377, filed Oct. 29, 1999, now U.S. Pat. No. 6,704,118 which is a continuation-in-part of U.S. patent application Ser. No. 09/347,953, filed Jul. 6, 1999, now U.S. Pat. No. 6,665,086 which is a continuation of U.S. patent application Ser. No. 08/754,721, filed Nov. 21, 1996, now U.S. Pat. No. 5,978,477 which are incorporated in their entirety herein by reference for all purposes.

This application makes reference to the following commonly owned patents and patent application, the entire contents of which are incorporated herein by reference for all purposes:

U.S. patent application Ser. No. 08/614,913, entitled, "A FAST METHOD FOR DETECTING INVERTED TEXT IMAGES ON A DIGITAL SCANNING DEVICE"

U.S. Pat. No. 5,893,908;

U.S. Pat. No. 5,854,854; and

U.S. Pat. No. 5,465,304.

BACKGROUND OF THE INVENTION

The present invention relates to a document management system and more particularly to providing automatic archiving to standard office equipment.

With the rapid development of storage system technology, the cost of storing an image of a sheet of paper on digital media has become less than the cost of printing and storing the sheet of paper itself. Digital document storage also facilitates later electronic search and retrieval and raises the possibility of automatic filing of documents.

Until now, systematic digital document storage has required user discipline to scan in each and every document for the express purpose of archiving. Work has been done to make stand-alone scanners less expensive, easier to use, and more compact. However, the user must still 1) remember that a document should be scanned, 2) locate a scanner, 3) bring the document to the scanner, and 4) operate the scanner. However, scanning occurs constantly in the office environment in the contexts of copying and faxing.

What is needed are techniques for providing searchable archival of document images.

SUMMARY OF THE INVENTION

The present invention provides techniques for automatically archiving documents that make archiving largely transparent to the user. In one embodiment, documents scanned in or printed during the course of office equipment operation are automatically archived. For example, an office local area network (LAN) may interconnect a variety of devices, such as a copier, a printer, a facsimile machine, a client computer, an email server, a document management workstation and the like. Whenever a document is copied, printed, faxed emailed, or the like a document image can be archived by the document management workstation without further user intervention. A single user command results in the document being copied and archived, printed and archived, faxed and archived, or emailed and archived.

In accordance with a first aspect of the invention, a method for processing document images includes steps of receiving a single user input command. Responsive to the single user input command, the method can receive a document to collect document image data. Determining at least one meta data index based upon the document image data can also be part of the method. Further, the method can include causing the document image data and the meta data to be archived.

In accordance with a second aspect of the invention, a method for printing and archiving documents includes receiving a single user command requesting that a document be printed, printing the document in response to the single user command, and archiving image data representing the document in response to the single user command.

In accordance with a third aspect of the invention, a method for archiving documents to be faxed includes receiving a single user command indicating that a document is to be faxed, scanning the document to be faxed in response to the single user command, transmitting first image data representing the document as scanned to a remote location via a public telephone network, and archiving, in response to the single user command, second image data representing the document as previously scanned.

In accordance with a fourth aspect of the invention, a computer installation includes a digital copier that scans in documents to be copied, a printer that prints documents, a computer system controlling a long-term storage medium, and a network interconnecting the digital copier, the printer, and the computer system. The digital copier relays image data representing the documents to be copied to the computer system for storage on the long-term storage medium. The printer, or a printer server controlling the printer, or a computer system initiating a command to print relays image data representing printed documents to the computer system for storage on the long-term storage medium.

In accordance with a fifth aspect of the invention, a digital copier includes a scanner that generates image data representing a document to be copied, an image processing unit that processes the image data to correct imaging errors introduced by the scan engine, a printer that copies the document responsive to the image data as processed by the image processing unit, and an image data tap that relays the image data to a storage system for archiving.

A further understanding of the nature and advantages of the inventions herein may be realized by reference to the remaining portions of the specification and the attached drawings.

DESCRIPTION OF SPECIFIC EMBODIMENTS

Overall Architecture for Automatic Archiving

Figure 1:
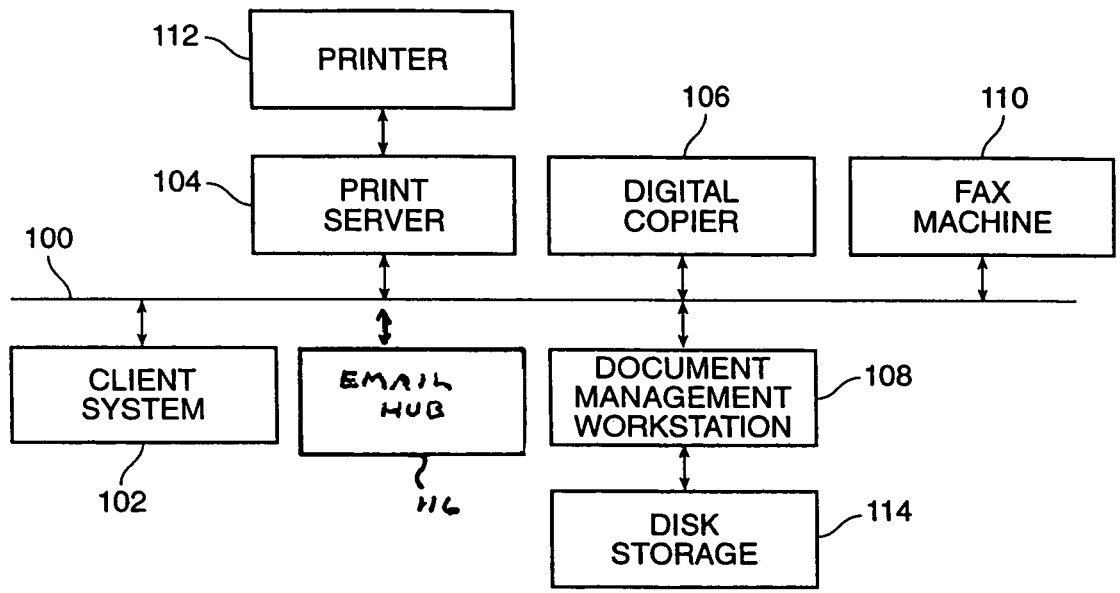
FIG. 1 depicts a simplified schematic diagram of a representative office machine network implementing automatic document archiving in a particular embodiment according to the present invention.

FIG. 1 depicts a simplified diagram of a representative office machine network implementing automatic document archiving in accordance with one embodiment of the present invention. This diagram is merely an illustration and should not limit the scope of the claims herein. One of ordinary skill in the art would recognize other variations, modifications, and alternatives. FIG. 1 depicts a network 100, that may be any of a plurality of networking topologies, such as Ethernet, token ring, and the like. Network 100 interconnects a representative client system 102, a print server 104, a special digital copier 106, a document management workstation 108, and a special facsimile machine 110. Print server 104 controls printing on a representative printer 112 at the request of client system 102 and relays document image data to document management workstation 108 for archiving. Digital copier 106 copies documents and transmits image data obtained during the course of copying to document management workstation 108 for archiving. Similarly, facsimile machine 110 captures image data during the course of sending and receiving documents and transmits the image data to document management workstation 108 for archiving. An email server 116 can collect electronic copies of email transmitted over network 100. Document management workstation 108 collects the document image data collected from all of the office equipment and maintains an archive on a disk storage unit 114. Client system 102 may browse this archive.

The configuration of network 100 is of course only representative. For example, automatic archiving of documents may be implemented with only one or two types of office machine instead of the depicted types. Also, functionality of one or more units shown in FIG. 1 may be combined into the same unit or divided among many units. Further, other office machines not pictured in FIG. 1 can be added in some embodiments according to the present invention by those of ordinary skill in the art without departing from the scope of the claimed invention.

Automatic Archiving of Copied Documents

Figure 2:
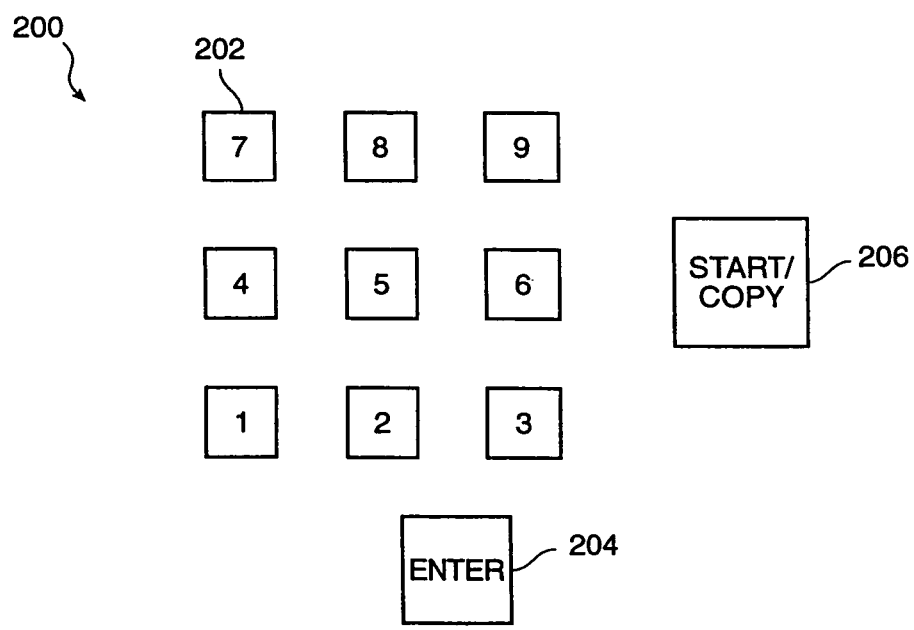
FIG. 2 depicts a simplified diagram of a portion of a copier control interface in a particular embodiment according to the present invention.

In accordance with a particular embodiment of the present invention, digital copier 106 transparently archives documents that are copied. FIG. 2 depicts a simplified diagram of a representative portion of a copier control interface 200 usable with digital copier 106. This diagram is merely an illustration and should not limit the scope of the claims herein. One of ordinary skill in the art would recognize other variations, modifications, and alternatives. Copier control interface 200 includes a numeric keypad 202, an Enter key 204, and a Start/copy key 206. Copier control interface 200 may be implemented using, e.g., a touch pad, touch screen, mechanical buttons, and the like. Controls for paper size, copy darkness, copy contrast, paper size, and magnification/reduction ratio (not shown) can be included in various embodiments of the present invention.

In accordance with one embodiment of the present invention, activation of Start/copy key 206 can initiate both copying of a document and archiving of an image of the document. The user positions the document, e.g., in a document feeder (not shown), and then enters a personal access code on numeric keypad 202 finishing access code entry by depressing Enter key 204. Depressing Start/copy key 206 represents a single user command that is interpreted by digital copier 106 to request both copying and archiving. Thus by copying, the user achieves both copying and archiving. In one embodiment, the user may enter a lock-out code to inhibit archiving, for instance, for privacy-protection purposes.

Details of the hardware for the copying and archiving processes will be described with reference to FIGS. 3-5.

Figure 3:
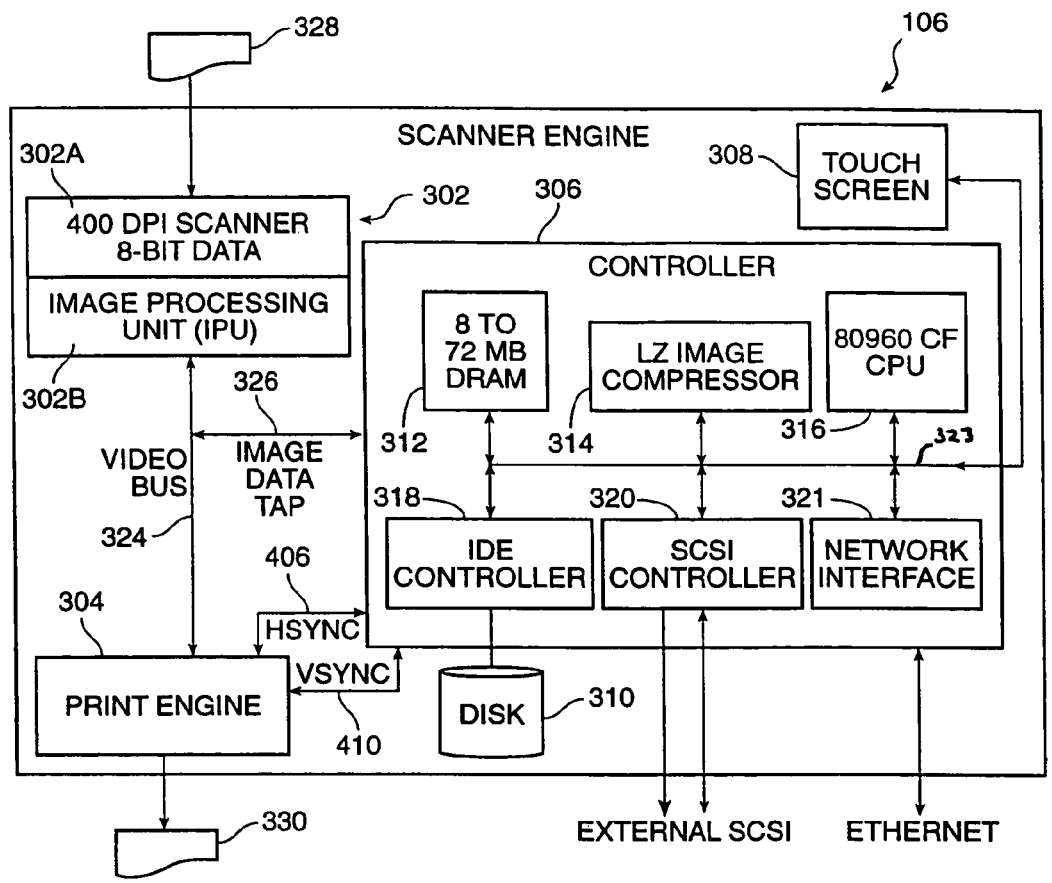
FIG. 3 depicts a simplified top-level diagram of a representative digital copier implementing automatic document archiving in a particular embodiment according to the present invention.

FIG. 3 depicts a simplified top-level diagram of a representative digital copier 106 implementing automatic document archiving in accordance with one embodiment of the present invention. This diagram is merely an illustration and should not limit the scope of the claims herein. One of ordinary skill in the art would recognize other variations, modifications, and alternatives. Digital copier 106 includes a scanner engine 302, a print engine 304, a controller 306, a touch screen 308, and an internal disk storage unit 310. Controller 306 includes a DRAM unit 312, an image compressor 314, which can be a Lempel-Ziv (LZ) image compressor, for example, a CPU 316, a persistent storage controller 318, which can be an IDE controller, for example, a SCSI controller 320, and a network interface 321. A bus 323 interconnects the controller elements. Scanner engine 302 includes a scanner 302A and an image processing unit 302B. A video bus 324 interconnects scanner engine 302 and print engine 304. An image data tap 326 provides controller 306 with access to image data transferred over video bus 324. Controller 306 also takes advantage of an HSYNC signal 406 and a VSYNC signal 410 generated within print engine 304.

Digital copier 106 accepts a document 328 and prints a copy 330 upon activation of Start/Copy key 206. Scanner 302A captures an image of document 328 and transmits the image to image processing unit 302B. Image processing unit 302B operates to remove distortion inherent in the scanning process. In a particular embodiment, the output of the image processing unit can be in a format where approximately 8 bits represent the grey-scale level of a pixel, there are about 4380 active pixels per line, and there are approximately 3380 active lines per frame or document page. There can be about a 10 pixel blanking period before and after each active line, making the total number of pixels per line of approximately, 4400. Similarly, there can be an approximately 10 line blanking period before and after every frame, making the total number of lines in a frame about 3400. Of course, these parameters are only representative, and other embodiments having different design choices can be conceived by those of ordinary skill in the art without departing from the scope and spirit of the present invention.

Pixel data is forwarded from image processing unit 302B to print engine 304 for printing. The data rate over video bus 324 can be approximately 20 MHz in one embodiment. Controller 306 monitors video bus 324 via image data tap 326 to receive the same pixel data. Although, it would be possible to monitor the pixel data prior to image processing unit 302B, the advantage to monitoring on video bus 324 is that image processing unit 302B is tightly coupled to scanner 302A, which can monitor and correct for errors inherent in the scanning process.

Controller 306 performs overall control functions for digital copier 106 including the archiving functions. CPU 316, which can be an INTEL 80960 CF micro-controller, for example, operates the control program for the operation of digital copier 106. Alternative embodiments can use an INTEL 80x86 family compatible processor, a MOTOROLA 68xxx family processor, or the like. Image data can be transferred into controller 306 at a faster rate via image data tap 326 than the image data can be archived. Accordingly, DRAM unit 312, preferably incorporating approximately 8 to 72 MB, or more, of DRAM, acts as a buffer for image data. This allows printing of the copy to continue without interruption by the archiving process.

To save on storage space and facilitate faster data transfer across network 100, LZ image compressor 314 may compress the image data prior to archiving. In one embodiment, a Lempel-Ziv image compression format is used. Other embodiments can include other image compression formats in accordance with the invention. With each block of image data to be archived, controller 306 incorporates the user ID data received from touch screen 308.

The actual archiving of document images may occur either locally or remotely. Controller 306 may maintain the archive on disk storage unit 310, in which case the image data will be transferred via IDE controller 318. The archive may also be maintained either internally or externally on SCSI drives to which image data is transferred via SCSI controller 320. Note, that if the archive is maintained on disk storage unit 310, or a disk drive accessible via SCSI controller 320, digital copier 106 will absorb some or all of the functionality of document management workstation 108. If the archive is maintained on document management workstation 108, network interface 321 sends the image data there via network 100 along with the user ID data for each particular document. Typically, LZ image compressor 314 is used in applications where documents are archived locally as opposed to remotely.

Figure 4:
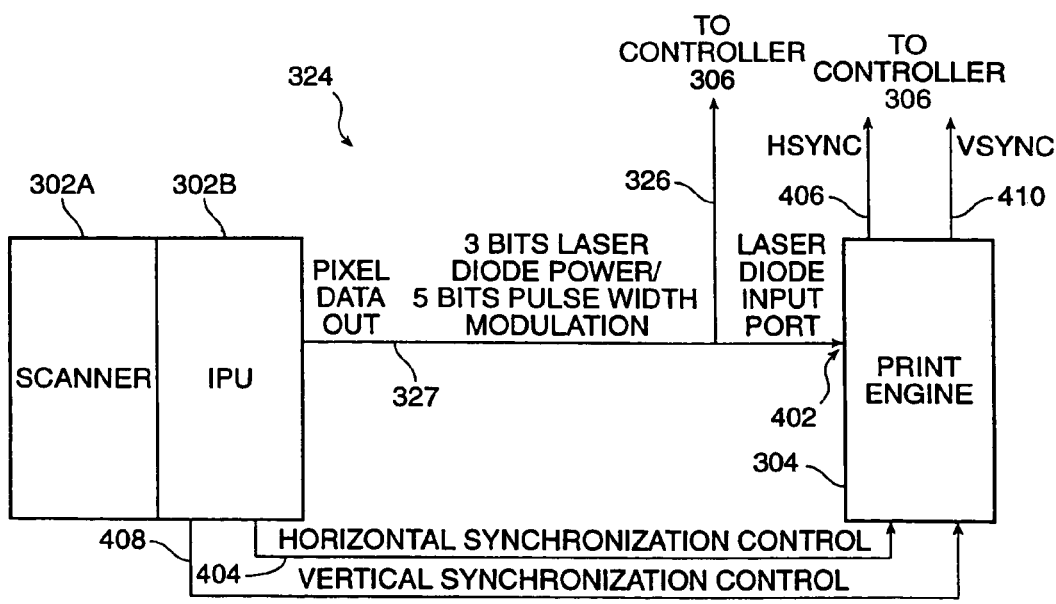
FIG. 4 depicts a simplified diagram of alternative signals usable for extracting horizontal synchronization data from a digital copier in a particular embodiment according to the present invention.

FIG. 4 depicts a simplified diagram of representative signals transferred over video bus 324 and image data tap 326 in accordance with one embodiment of the present invention. This diagram is merely an illustration and should not limit the scope of the claims herein. One of ordinary skill in the art would recognize other variations, modifications, and alternatives. A pixel data line 327 carries the image data generated by image processing unit 302B in a format to drive a laser diode input port 402 of print engine 304.

Print engine 304 operates in accordance with well-known laser xerography principles and incorporates a laser diode that varies in illumination intensity responsive to the document image to be printed. The 8 bits input to laser diode input port 402 includes 3 bits modulating the intensity of illumination of the laser diode and 5 bits modulating the width of illumination pulses. These pixels transfer over a pixel data line 327 at an approximately 20 MHz rate. In one presently preferred embodiment, the image data presented at laser diode input port 402 is directly relayed to controller 306 via image data tap 326.

The beam output of the laser diode passes through a system of lens and mirrors that generates the horizontal scanning action to sweep the beam over a rotating xerographic drum, thereby recreating the document image as a charge pattern on the drum. Typically, the rotation of a polygonal mirror tracks the scanning action. To assure the highest quality of reproduction, printing requires careful synchronization between the constituent parts of the scanner 302A, image processing unit 302B and the Print Engine 304. This synchronization is performed using the horizontal and vertical video synchronization signals, lines 404, 406, 408, and 410. These signals can be interrelated in terms of synchronization to the motion inherent in the rotating polygonal mirror which provides faster scanning in the print engine, and in terms of the scanner 302A. In some embodiments, the timing may be obtained by the print engine 304, and circuitry in image processing unit 302B is phase-locked to that timing. In an alternate embodiment, image processing unit 302B may provide the master timing to the print engine 304, which subsequently phase-locks or otherwise synchronizes its mechanical motion to these source signals. This embodiment is illustrated in FIG. 4. Those skilled in the art will recognize the many and various alternative selections of the master reference timing sources used for generating the synchronization signals in FIG. 4, in various embodiments according to the present invention.

Horizontal synchronization signal (HSYNC) 406 for the image data may be obtained from print engine 304 in many ways. One technique is to position an optically sensitive sensor at a point within the optical system where the scanning action of the beam may be monitored. A pulse is generated every time the beam reaches an extremity of the scan. Depending on the particular design of the optical system, this pulse rate may be a harmonic or sub-harmonic of the actual horizontal synchronization rate.

Another technique is to attach an optical encoder to the motor that rotates the polygonal mirror. By monitoring the motor operation in this, or some other way, horizontal synchronization signal 406 may be derived. It is also possible to derive horizontal synchronization signal 406 from the control signal which drives the motor.

A vertical synchronization control 408 also incorporates information about the scanning action of scanner 302A. To assure high quality reproduction, the movement of paper through print engine 304 takes this vertical synchronization control information into account. Vertical synchronization signal 410 may be obtained from print engine 304 in a variety of ways. One way is to tap off an internal signal that gates a new sheet of paper to pass underneath the xerographic drum.

The horizontal and vertical synchronization signals 406 and 410 can be used to assure that only valid pixels are archived. Data indicating the number of lines on each page and the line length in pixels is also archived with the pixels. Thus, when the document is retrieved for printing later, printing of the document inherently takes advantage of the information present on vertical synchronization control 408 and horizontal synchronization control 404, namely image position within a page, and more particularly, the size of paper printed upon. Furthermore, the document image has already been subject to sophisticated image processing by Image Processing Unit 302B. The final printed document can be a very high quality reproduction.

The present invention is however not restricted to capturing image data for archiving at the output of an image processing system such as Image Processing Unit 302B. Whether or not such an image processing system is present, image data for archiving may be captured at the output of scanner 302A.

Automatic Archiving of Printed Documents

Figure 5:
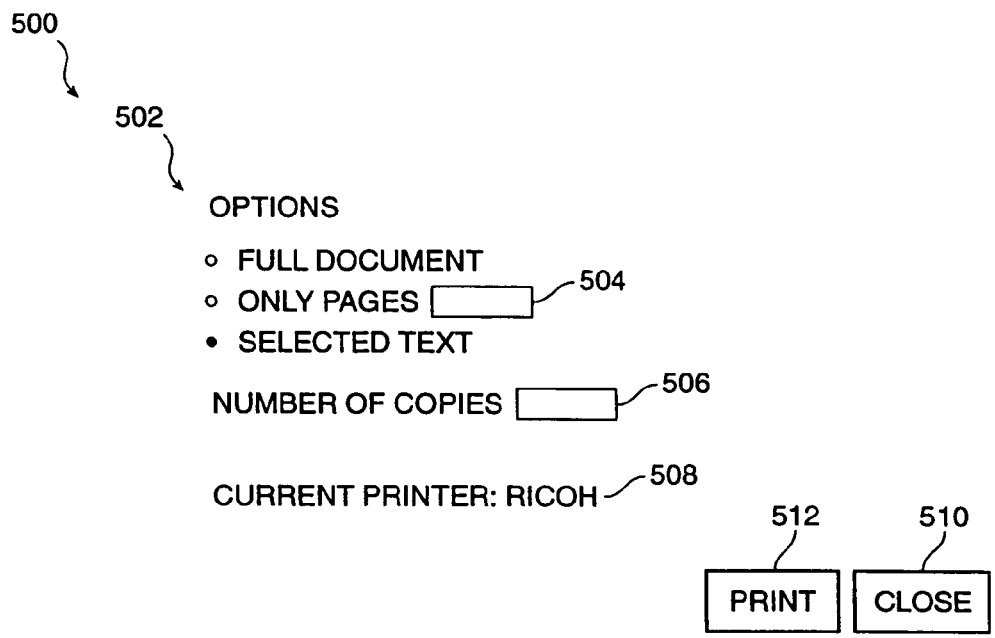
FIG. 5 depicts a simplified diagram of a representative printer interface in a particular embodiment according to the present invention.

FIG. 5 depicts a simplified diagram of a representative user interface screen 500 for operating a printer. This diagram is merely an illustration and should not limit the scope of the claims herein. One of ordinary skill in the art would recognize other variations, modifications, and alternatives. A user interface screen such as screen 500 is generally displayed by client system 102 whenever the user requests printing of a document. A list 502 of options permits the user to select whether the full document is to be printed, only a specified range of pages, or only text that has been highlighted using a pointing and selection device such as a mouse. If a range of pages is to be specified, a field 504 is used to enter the range of page numbers. A field 506 permits the user to specify a number of document copies to be printed. A "current printer" field 508 identifies the printer that will be used to print the document. Activation of a "Close" screen button 510 dismisses user interface screen 500.

In accordance with one embodiment of the present invention, activation of "Print" button 512 represents a single user command to both print and archive the document. Client system 102 sends the document to be printed to print server 104 which runs print spooling software for writing to printer 112. The print spooling software maintains a queue of print jobs to run. The document may be sent to print server 104 in any format, such as text, TIFF, GIF, postscript, etc. Printer 112 will typically accept postscript input but other printer configurations are also possible. If the format of transmission by client system 102 is different from the format accepted by printer 112, printer server 104 will also perform format conversion.

In a particular embodiment according to the present invention, each document handled by print spooling software is sent to document management workstation 108. The document may be transmitted in either the format generated by client system 102 or any format to which printer server 104 is able to convert. The document may be sent to document management workstation 108 with data identifying the current user of client system 102. Thus, archiving becomes an incidental consequence of the printing process. Previously printed documents are retrievable.

Automatic Archiving of Faxed Documents

Figure 6:
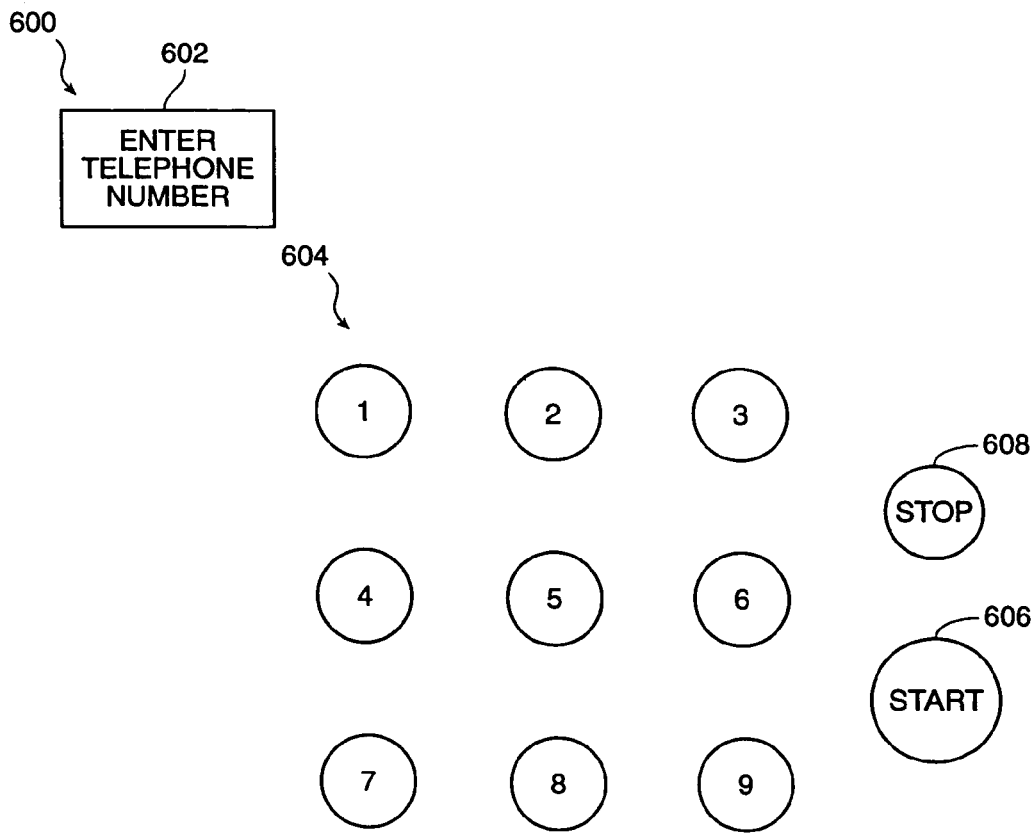
FIG. 6 depicts a simplified diagram of a facsimile machine interface in a particular embodiment according to the present invention.

FIG. 6 depicts a simplified diagram of a representative facsimile machine user interface 600. This diagram is merely an illustration and should not limit the scope of the claims herein. One of ordinary skill in the art would recognize other variations, modifications, and alternatives. A display screen 602 provides the user with prompts. A keypad 604 allows for entry of a telephone number to which a document is to be faxed. Depression of a start button 606 causes a document to be scanned into a memory within a facsimile machine or, if a document has already been scanned into memory and a telephone number has been entered, causes the document to be faxed to the entered telephone number. Depression of a stop button 608 causes faxing to cease. In accordance with the present invention, depression of start button 606 at the appropriate time represents a single user command to both fax and archive a document.

Figure 7:
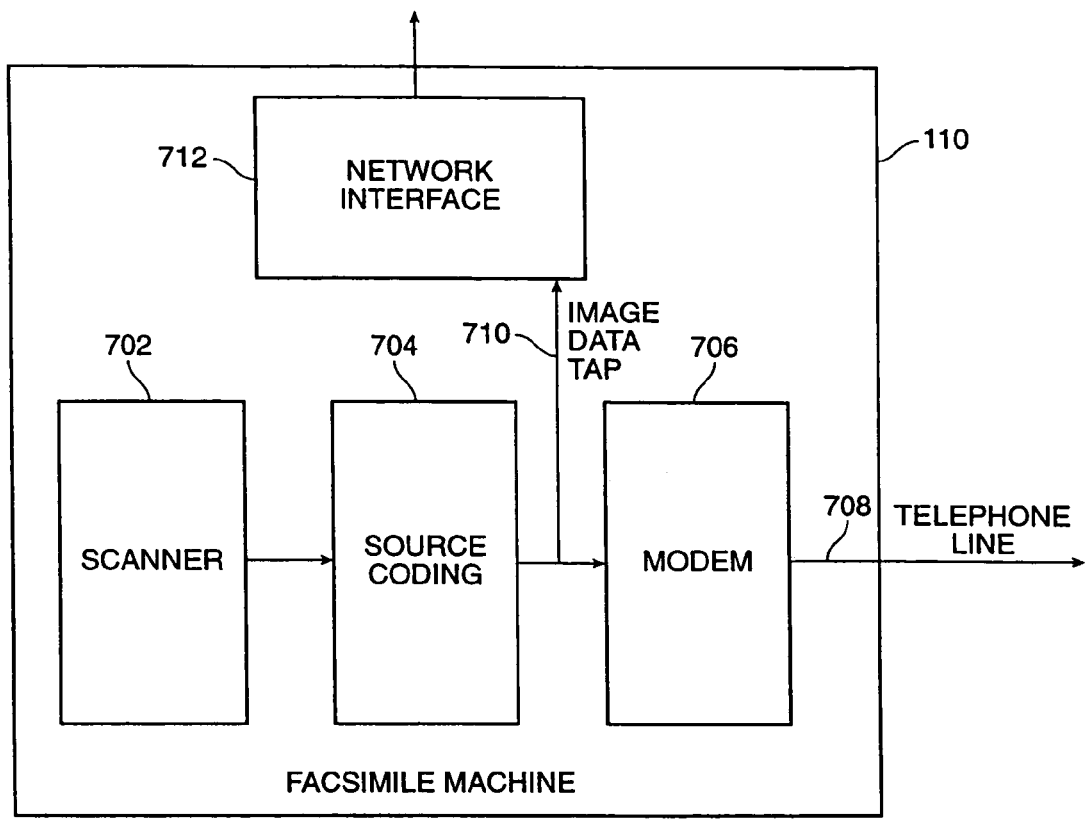
FIG. 7 depicts a simplified diagram of a facsimile machine suitable for implementing automatic archiving in a particular embodiment according to the present invention.

FIG. 7 depicts a simplified diagram of a representative facsimile machine 110 modified for automatic archiving in accordance with one embodiment of the present invention. This diagram is merely an illustration and should not limit the scope of the claims herein. One of ordinary skill in the art would recognize other variations, modifications, and alternatives. Facsimile machine 110 incorporates a scanner 702 for scanning a document to be faxed and storing a binary pixel representation of the document in a memory (not shown) internal to scanner 702. A source coding unit 704 compresses the gray scale pixel data in accordance with facsimile transmission standard, e.g., Group III. A modem 706 modulates a carrier with the compressed data output of source coding unit 704 in accordance with the relevant facsimile transmission standard to generate a modulated signal to output on a telephone line 708.

In accordance with one embodiment of the present invention, an image data tap 710 transmits the compressed data output of source coding unit to a network interface 712. Network interface 712 in turn sends the compressed data output representing a document to document management workstation 108 for archiving. In an alternative embodiment, image data tap 710 is instead positioned at the output of scanner 702.

Optionally, the user enters a code number on keypad 604 to identify himself or herself. This information is also sent to document management workstation 108 to be stored with the faxed document. Alternatively, the identity of the user of facsimile machine 110 is already known in some other way.

Thus, every document that is faxed is also archived without further user input. This provides yet another source of document images for the archive maintained by document management workstation 108.

Automatic Archiving of Email Documents

Email messages sent and received by a user can be captured on the client system 102 or at an email hub 116. Users typically read and send email with an email reader on a client system 102. Such email readers are typically provided with the ability to save copies of every message sent and received by a user. For example, NETSCAPE COMMUNICATOR has this ability as does the BERKELEY UNIX MAIL READER. Such email readers can be configured so these message copies are passed automatically to the document management workstation 108.

In an alternative embodiment, email document archival is performed by software on an email hub. Email hub 116 comprises a computer software system on a network that transfers email messages between client systems and the Internet. The email hub software routes and delivers mail over networks. In a particular embodiment, the email hub can use the Sendmail package. For more detailed information about Sendmail, further reference may be had to www.sendmail.org and to B. Costales and E. Allman, "Sendmail" (2d. ed.), by O'Reilly and Associates, Inc., 1997, the entire contents of which are incorporated herein by reference for all purposes. There are other email hub systems that function similarly.

In a representative embodiment, the behavior of the email hub 116 can be controlled by a configuration file, tables, or the like. The configuration determines how messages are forwarded, transformations that are applied to email addresses, and the like. The configuration file can be configured so that the email hub 116 sends a copy of every message sent and received by a user, including the origin and destination addresses and the date and time of transmission, to the document management workstation 108.

Thus, every document that is emailed is also archived without further user input. This provides yet another source of document images for the archive maintained by the document management workstation 108.

Document Management Workstation

Figure 8:
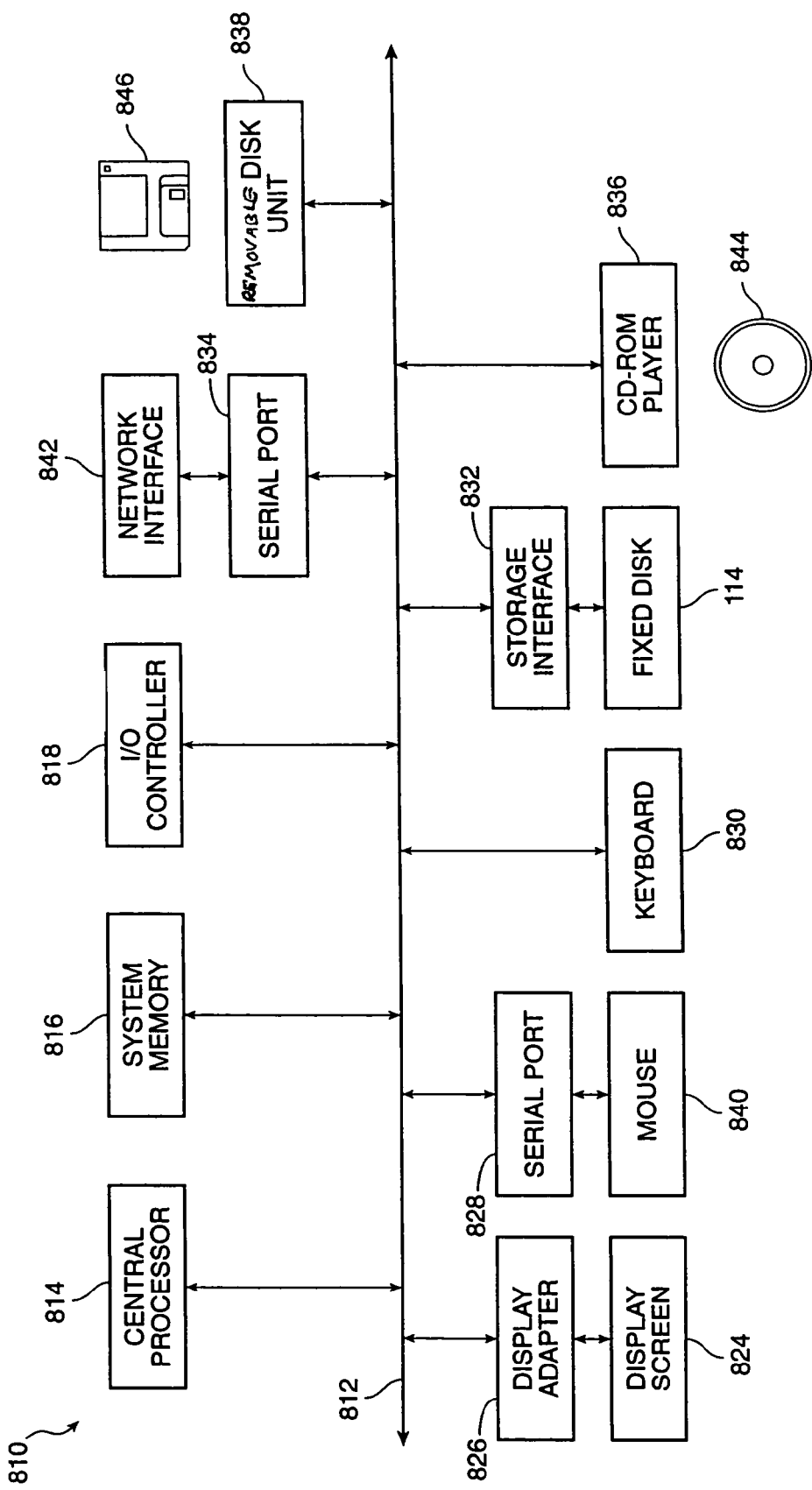
FIG. 8 depicts simplified diagram of a representative computer system suitable for implementing automatic archiving in a particular embodiment according to the present invention.

FIG. 8 depicts a simplified diagram of a representative computer system 810 suitable for implementing any one or more of client system 102, print server 104, or document management workstation 108 in accordance with one embodiment of the present invention. This diagram is merely an illustration and should not limit the scope of the claims herein. One of ordinary skill in the art would recognize other variations, modifications, and alternatives. Computer system 810 includes bus 812 which interconnects major subsystems such as central processor 814, system memory 816, input/output (I/O) controller 818, external device such as display screen 824 via display adapter 826, serial port 828, keyboard 830, fixed disk drive 114 via a storage interface 832, a serial port 834, a CD-ROM player 836, and a removable-disk drive 838. A mouse 840 may connect to serial port 828. A network interface 842 for connection to network 100 may connect to serial port 834. CD-ROM player 836 receives a CD-ROM disk 844. Removable-disk drive 838 receives a removable disk 846. Many other devices or subsystems (not shown) may be connected in a similar manner. Also, it is not necessary for all of the devices shown in FIG. 8 to be present to practice the present invention, as discussed below. The devices and subsystems may be interconnected in different ways from that shown in FIG. 8. The operation of a computer system such as that shown in FIG. 8 is readily known in the art and is not discussed in detail in the present application. Source code to implement elements of the present invention may be operably disposed in system memory 816 or stored on storage media such as fixed disk 114, removable disk 846, or CD-ROM 844.

Figure 9:
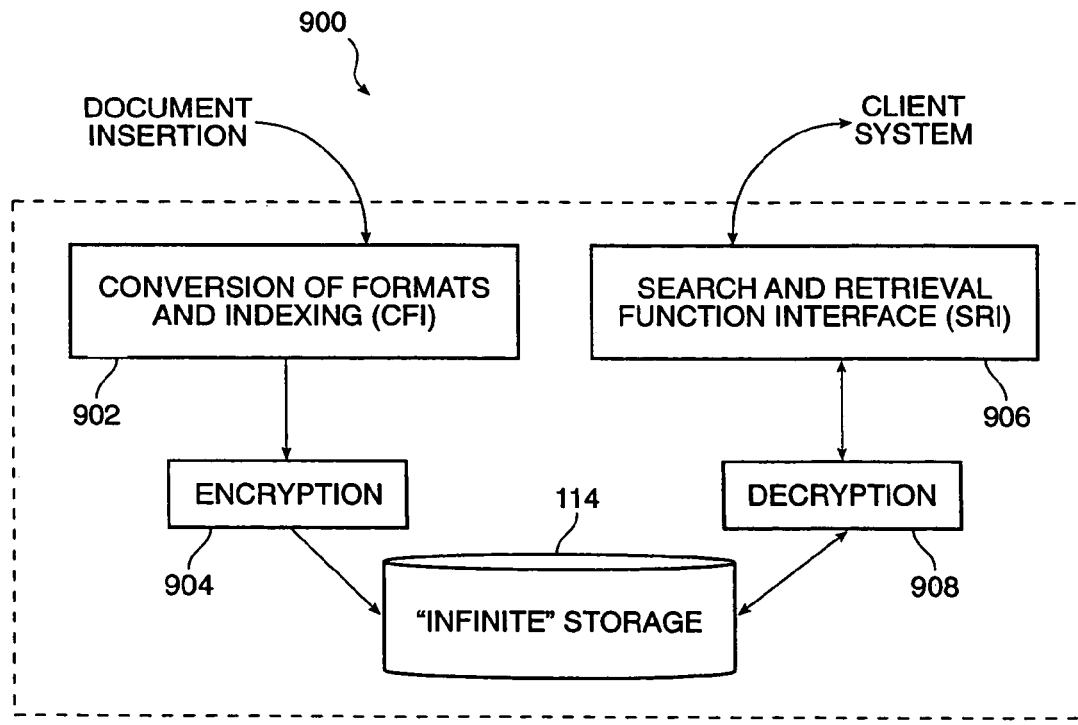
FIG. 9 depicts a simplified diagram of a representative software architecture for operating a document image database a particular embodiment according to the present invention.

FIG. 9 depicts a simplified diagram of a representative software architecture 900 for operating a document image database in accordance with one embodiment of the present invention. This diagram is merely an illustration and should not limit the scope of the claims herein. One of ordinary skill in the art would recognize other variations, modifications, and alternatives. In a present embodiment, the software operates on document management workstation 108. Documents to be archived are received by a CFI (conversion of formats and indexing) module 902 from any one of digital copier 106, print server 104, or facsimile machine 110. CFI module 902 converts the format of the received document to a desired format for storage. CFI module 902 may, e.g., receive the data in the 8 bit pixel format discussed in reference to digital copier 106 along with synchronization information useful for high quality reproduction. These desired formats include, e.g., postscript, 8 dpi GIFF, 72 dpi GIFF, 400 dpi TIFF, and plain text. Converting from a graphic format to plain text includes the process of optical character recognition. CFI module 902 also applies an indexing system to the documents to be archived. For plain text documents, the index information generated for the document facilitates later full text searching. If the identity of the user is available, this will also form a part of the indexing information for the document to facilitate later retrieval by the user.

Some specific embodiments according to the present invention can store data along with archived documents. Such data can be used to facilitate later access of the archived documents, for example. Select embodiments can store data representing a source device type, for example. A source identifier can indicate whether the originating device was a copier, a multifunction machine, a printer, a fax machine, a scanner and the like. Data representing a creation time of a document can also be stored by some embodiments. Creation times can be significantly different from the time the document was last saved because of network outages, and the like. For example, a copier might capture a document but not be able to send it to the document image database for saving until a later time.

In some embodiments, data representing a network address of the source device can be stored along with the archived image. For example, an IP address such as 128.205.32.1, can be stored with documents originating from a workstation assigned to that particular IP address. Networked devices each have a unique network address. This address can serve as a useful indexing cue since it can distinguish one network machine from another. A user can look for a document that was copied on a certain multifunction machine, using search techniques applied to network addresses stored with document images. This kind of query is easily performed using the network address. In a particular embodiment, searching by network addresses can be done by maintaining a table that maps network addresses onto device types and physical locations, for example.

In some embodiments, data representing individual devices can be stored with a document and used to facilitate later access. For example, data representing access permissions set by users when documents are processed can be stored with the archived document images. In a specific embodiment, a user can explicitly instruct a multifunction machine to save a copy of a document with specific access instructions in order to make the document available to everyone. The same operation can be performed at the console of a copier, a fax machine, or scanner, for example. Users can also set access permissions at the command line when they print a document.

In some embodiments, data representing direction of transit can be stored along with the archived image of the document. For example, a fax machine can supply information about whether a saved document was an incoming or outgoing fax. Select embodiments can also save destination information. In a particular embodiment, a fax machine can supply the telephone number to which a document was sent in the case of an outgoing fax. A fax machine equipped with caller ID logic can supply the telephone number and in some cases the name of the party that sent an incoming fax.

Some embodiments can store page size and orientation information. A multifunction machine, a copier, a scanner, or a fax machine can supply information about the orientation (portrait or landscape) and paper size (letter, legal, A4, etc.) of saved documents. This information is readily available in these devices. For example, many multifunction machines and copiers compute it to determine which paper tray to use. Multiple orientations and sizes are typically provided. Select embodiments can also store page transformation information. For example, a multifunction machine, a copier, a scanner, or a fax machine can provide information about the page transformation applied when users scan documents. Page transformation can include information about specific page transformations, such as placing several pages side-by-side in reduced form, two-sided printing, rotation angles, reduction or enlargement ratios, scanning resolution, banners such as "CONFIDENTIAL," and the like.

Some specific embodiments according to the present invention, can store calculated data along with archived documents. Such calculated data can be used to facilitate later access of the archived documents. For example, in select embodiments, document management workstation 108 can compute additional index information about a document after the document has been input, without modifications to the capture devices. In a particular embodiment, page size and orientation can be computed and stored. The size of a scanned document image originating on a multifunction machine, copier, scanner, or fax can be directly measured. For example, a 3400×4400 pixel image that originated on a 400 dpi scanner can be determined to be an 8.5×11 inch letter size document. The orientation of a document image can be detected by measurements on features extracted from its image. A commonly owned U.S. patent application Ser. No. 08/614,913, entitled, "A FAST METHOD FOR DETECTING INVERTED TEXT IMAGES ON A DIGITAL SCANNING DEVICE," the entire contents of which is incorporated herein by reference for all purposes, describes one method for determining page orientation by counting the ascenders on lower case English characters. In other particular embodiments, page orientation can also be calculated by inputting versions of a document rotated in different orientations to an Optical Character Reader (OCR). The "correct" orientation typically produces a comparatively large number of character decisions. In a still further embodiment, page orientation of a printed document can be calculated from its printer description file. For example, in a postscript file and a rendering engine, e.g., the "ghostscript system" (http://www.cs.wisc.edu/~ghost/), which is incorporated herein by reference in its entirety for all purposes, code can be inserted in the postscript file that is executed every time a character is rendered. The code counts the orientations of rendered characters. The orientation of a page corresponds to the most frequently occurring character orientation.

Some embodiments can compute and store page transformations. The existence of various image characteristics useful for later retrieval can be calculated from a document image. For example, one technique for calculating the skew angle of a document image is described in a commonly owned U.S. Pat. No. 5,854,854, the entire contents of which are incorporated herein by reference for all purposes. In a further embodiment, a technique for segmenting and counting the number and size of image and text blocks in a document image is described in a commonly owned U.S. Pat. No. 5,465,304, the entire contents of which are incorporated herein by reference for all purposes. In a yet further embodiment, a technique for calculating the number of columns in a document image is described in L. O' Gorman, "The document spectrum for page layout analysis," IEEE Transactions on Pattern Analysis and Machine Intelligence, v. 15, no. 11, November, 1993, 1162-1173, the entire contents of which are incorporated herein by reference for all purposes.

In a particular embodiment, page transformations for a printed document can be calculated from its printer description file. For example, given a postscript file and a rendering engine, e.g., the "ghostscript system" (http://www.cs.wisc.edu/~ghost/), which is incorporated herein by reference in its entirety for all purposes, code can be inserted in the postscript file that is executed every time a character is rendered. This code saves the (x, y) origin at which a character is placed, yielding an array of coordinates. One or more of the techniques noted above in connection with the above referenced patents can be applied to this array of coordinates to calculate the skew angle of the document. Some embodiments can detect multiple columns of text in a document by adding the x coordinate for every character to an accumulator array. Frequently occurring values correspond to the beginning of a column of text. The presence of images in a printed document can be detected with a similar technique. The postscript image operator can be augmented with code that saves the location and size of images in a document.

For each document to be archived, a separate HTML document is generated with an iconic form of the images (8 dpi GIF) to be archived and keywords from a text document that is stored. One set of HTML index pages is maintained for each user. Each HTML index page in the set provides a different view of the images in a user's database. For example, one page provides a sequential listing of every saved image, including the document icons. Another page provides a sequential listing of all the documents which shows an ASCII summary of each image without showing the icons. CFI module 902 performs the necessary conversions.

An encryption module 904 optionally encrypts the document to be archived and its HTML counterpart with an encryption key particular to the user. This way only the user and other authorized parties may retrieve the encrypted document. The encrypted documents are stored on disk storage unit 114.

An SRI module (search and retrieval interface) module 906 provides access to the document archive maintained on disk storage unit 114. Decryption system 908 is provided as an option for encrypted documents. SRI module 906 is implemented as an HTTP daemon operating on document management workstation 108. SRI module 906 is preferably the only search and retrieval path to the document archive. This restricted form of access allows log access information to be maintained. SRI module 906 processes HTTP requests from client system 102 to browse HTML documents on disk storage unit 114, or to search and retrieve the archived documents. Full text search is implemented with a WAIS engine or other search engine (e.g., VERIFY, EXCALIBUR, FULCRUM) implemented with SRI module 906. Queries are entered by the user in an HTML form and transmitted to the search engine using a CGI script running in SRI module 906. An initial user request should incorporate a password to authorize decryption by decryption system 908.

To facilitate user interaction with SRI module 906, client system 102 preferably runs a world wide web browser such as NETSCAPE NAVIGATOR obtainable from Netscape Communications of Mountain View, Calif. Java programs may be downloaded from SRI module 906 to perform functions such as searching or display and printing of particular document formats.

Of course, the storage and retrieval architecture discussed above is only representative. In a commonly owned U.S. Pat. No. 5,893,908, entitled, "DOCUMENT MANAGEMENT SYSTEM" includes many other applications of an automatic archiving system.

In the foregoing specification, the invention has been described with reference to specific exemplary embodiments thereof. It will, however, be evident that various modifications and changes may be made thereunto without departing from the broader spirit and scope of the invention as set forth in the appended claims. Many such changes or modifications will be readily apparent to one of ordinary skill in the art. For example, digital copier 106 may also act as a printer for client system 102. Also, the network 100 may include connections over a WAN or the Internet, allowing remote archiving and retrieval of documents. The specification and drawings are, accordingly, to be regarded in an illustrative rather than a restrictive sense, the invention being limited only by the provided claims and their full scope of equivalents.

What is claimed is:

1. An email server for performing automatic capture archiving of electronic documents in a network environment, at least one client computer in the network environment being coupled over a network to at least one document management workstation having at least one database disposed to receive electronic copies of documents transferred over the network, the at least one document management workstation being in communication with at least one of a copy, print, and facsimile operation, said email server being operatively disposed to:

receive a copy of every email document transferred over the network from the at least one client computer, each email document being transferred over the network in response to a single user input command;

cause electronic image data to be generated for each received copy of an email document, the electronic image data being generated in a format acceptable for storage in the at least one database for the at least one document management workstation; and cause the generated electronic image data to be stored in the at least one database to perform capture archiving of the email document, wherein the at least one database further comprises image data from capture archiving of electronic document images from the at least one of a copy, print, and facsimile operation, wherein the aforementioned steps are carried out transparent to the user and without further input from the user notwithstanding the single user input command, wherein the aforementioned steps are carried out at substantially a time that the email document is transferred over the network.

2. The email server of claim 1, wherein the at least one of the copy, print, and facsimile operation comprises at least one of a copier operation, printer operation, and facsimile machine operation that archived image data for at least one of the copier operation, printer operation, and facsimile machine operation.

3. The email server of claim 2, wherein the image data is generated from hardcopy documents and electronic documents.

4. A method for automatically and transparently archiving electronic documents in a network environment, at least one client computer in the network environment being coupled over a network to at least one document management workstation having at least one database disposed to receive electronic copies of documents transferred over the network, the at least one document management workstation being in communication with at least one of a copier operation, a printer operation, and a facsimile machine operation, the method comprising:

receiving a copy of every email document transferred over the network from the at least one client computer, each email document being transferred over the network in response to a single user input command;

generating electronic image data for each received copy of an email document, the electronic image data being generated in a format acceptable for storage in the at least one database for the at least one document management workstation; and causing the generated electronic image data of every received email document to be stored in the at least one database to perform image capture archiving of the email document, wherein the aforementioned steps are performed transparent to the user and without further input from the user notwithstanding the single user input command, wherein the at least one database is further configured to store image data that was archived from the at least one of a copier operation, a printer operation, and a facsimile machine operation, and wherein the aforementioned steps are carried out at substantially a time that the email document is transferred over the network.

5. The method of claim 4, wherein causing the collected image data of every email to be stored comprises storing at least one of an origin address and destination address for an email.

6. The method of claim 4, wherein causing the collected image data of every email to be stored comprises storing at least one of a date of transmission and time of transmission for an email.

7. An email server for performing automatic capture archiving of electronic documents in a network environment, said email server operatively disposed to:

generate a copy of each email document transmitted over the network environment, the email document being transmitted in response to a single user input command configured to transmit the email document to a destination; and forward each copy to a document management device, the forwarding of each copy causing the document management device to generate electronic image data for each copy of an email document, the electronic image data being generated in a compressed image format, the forwarding of each copy further causing the generated electronic image data to be stored in the at least one database to perform the capture archiving, the capture archiving being performed without further input from the user notwithstanding the single user input command for transmitting the email document to a destination, the storing of said image data in the at least one database being separate from the transmission of the email document to the destination and transparent to the user, the capture archiving for each email document occurring at substantially a time that the email document is transferred over the network.

8. The email server of claim 7, wherein the destination comprises a destination client system.

9. The email server of claim 7, wherein the email document comprises an email document that was at least one of received and sent.

10. The email server of claim 7, wherein at least one database is configured to store image data that was archived from at least one of a copier operation, a printer operation, and a facsimile machine operation.

11. A method for providing automatic and transparent archiving of electronic documents in a network environment, the method comprising:

generating a copy of each email document transmitted over the network environment, the email document being transmitted in response to a single user input configured to transmit the email document to a destination; and forwarding each copy to a document management device, the forwarding of each copy causing the document management device to generate electronic image data for each copy of an email document, the electronic image data being generated in a format acceptable for storage in at least one database for the document management device, the forwarding of each copy further causing the generated electronic image data of the email document to be stored in at least one database to perform the capture archiving, the capture archiving being performed transparent to the user and without further input from the user notwithstanding the single user input command for transmitting the email document to a destination, the capture archiving for each email document occurring at substantially a time that the email document is transferred over the network.

12. The method of claim 11, wherein the destination comprises a destination client system.

13. The method of claim 11, wherein the email document comprises an email document that was at least one of received and sent.

14. The method of claim 11, wherein at least one database is configured to store image data that was archived from at least one of a copier operation, a printer operation, and a facsimile machine operation.

15. The method of claim 14, wherein the image data is generated from a hardcopy.

16. The method of claim 15, wherein the hardcopy is a paper printout.

17. The method of claim 16, wherein the copier operation comprises a copy machine, the printer operation comprises a printer and the facsimile machine operation comprises a scanner, and wherein the copy machine, the printer and the scanner are configured to generate electronic image data based on the paper printout.

* * * * *